United States Patent
Jabaji et al.

(10) Patent No.: US 7,157,806 B2
(45) Date of Patent: Jan. 2, 2007

(54) SYSTEM AND METHOD FOR CONTROLLING AND DISTRIBUTING ELECTRICAL ENERGY IN A VEHICLE

(75) Inventors: Issam Jabaji, Morton Grove, IL (US); Shadi Jabaji, Morton Grove, IL (US)

(73) Assignee: C. E. Niehoff & Co., Evanston, IL (US)

( * ) Notice: Subject to any disclaimer, the term of this patent is extended or adjusted under 35 U.S.C. 154(b) by 314 days.

(21) Appl. No.: 10/800,321

(22) Filed: Mar. 12, 2004

(65) Prior Publication Data

US 2005/0200201 A1   Sep. 15, 2005

(51) Int. Cl.
*B60L 1/00* (2006.01)
(52) U.S. Cl. .................................... 307/9.1
(58) Field of Classification Search ............ 307/9.1, 307/10.1
See application file for complete search history.

(56) References Cited

U.S. PATENT DOCUMENTS

| | | | |
|---|---|---|---|
| 3,763,415 A | 10/1973 | Ownby | |
| 5,488,283 A | 1/1996 | Dougherty et al. | |
| 5,619,417 A | 4/1997 | Kendall | |
| 5,977,652 A | 11/1999 | Frey et al. | |
| 6,222,341 B1 | 4/2001 | Dougherty et al. | |
| 6,232,674 B1 | 5/2001 | Frey et al. | |
| 6,304,054 B1 | 10/2001 | Granberg et al. | |
| 6,459,175 B1 * | 10/2002 | Potega | 307/149 |
| 6,493,248 B1 * | 12/2002 | Bingley | 363/131 |

* cited by examiner

*Primary Examiner*—Robert L. DeBeradinis
(74) *Attorney, Agent, or Firm*—Law Offices of Michael M. Ahmadshahi

(57) ABSTRACT

This invention discloses a load and battery control device for controlling and distributing electrical energy in a vehicle electrical system comprising a generator, an electrical load, and a stored energy source. The device monitors and processes electrical signals generated by the vehicle electrical system and compares them to a vehicle operating state. The device operates on a switching system to controllably connect or disconnect the generator, electrical load, or stored energy source, or any combination thereof, with the vehicle electrical system to be consistent with a pre-determined vehicle operating configuration.

75 Claims, 7 Drawing Sheets

SYSTEM AND METHOD FOR CONTROLLING AND DISTRIBUTING ELECTRICAL ENERGY IN A VEHICLE

This specification includes a compact disk appendix, which contains computer program code listings pursuant to 37 C.F.R. 1.52(e), and is hereby incorporated by reference. The computer codes are in ASCII format and are as follows:

| Creation Date | Creation Time | File Size (Kilobytes) | File Name |
|---|---|---|---|
| Jan. 22, 2004 | 11:00 AM | 27 | Pid.c |
| Feb. 17, 2003 | 01:06 PM | 17 | Can.h |
| Nov. 11, 2003 | 11:15 AM | 2 | Defines.h |
| Sep. 23, 2003 | 03:16 PM | 4 | EEPROM.h |
| Sep. 23, 2003 | 11:45 PM | 8 | Registers.h |
| Nov. 2, 2001 | 9:30 AM | 2 | VECTORS.h |
| Jan. 22, 2004 | 11:00 AM | 14 | PID_D.S19 |

This appendix includes copyrighted materials, and the assignee of the present invention retains all copyright rights, other than the right to reproduce the appendix as a portion of the specification.

FIELD OF INVENTION

This invention is related to vehicle electrical systems. In particular, this invention relates to a device, comprising a system and method, which controls the distribution of electrical energy to the associated electrical loads and stored energy sources.

BACKGROUND

The present invention focuses on the development of a control device in a vehicle electrical system, which controls the flow of energy between a generator, various electrical loads, and stored energy sources in a vehicle.

A vehicle electrical system is generally comprised of a generator, electrical loads comprising a multitude of electrical and/or electromechanical devices, and stored energy sources, such as batteries, which provide electrical energy when the generator is not operating.

A common problem in electrical systems that employ a stored energy source such as a battery is gradual dissipation of the stored energy via leakage associated with devices that remain connected to the electrical circuit. The accumulation of such leakage in the electrical system over an extended period depletes the stored energy source. Accordingly, there is a need for a control device that protects the stored energy sources from the detrimental effect of electrical leakage.

Environmental conditions also aggravate energy dissipation from stored energy devices. Rain, humidity, and condensation promote dendrite growth between surfaces of opposite polarity that eventually develops into a short circuit. This can happen in any electronic circuit that is not hermetically sealed. Consequently, there is a need for a control device that disconnects the electrical system from the loads to reduce the incidence of moisture related dendrite growth in electronic circuits.

As a safety measure, vehicle maintenance personnel routinely disconnect the battery from the vehicle electrical systems during electrical service. Manual battery disconnection is time consuming and poses a risk of accidental arcing and subsequent misconnection of the leads when the circuit is restored. Therefore, there is a need for a load and battery charge device which is capable of disconnecting the battery and other stored energy sources from the vehicle electrical systems without requiring physical removal of battery cables.

Advances in vehicle electrical system technology have led to the incorporation of various intelligent controller-based devices in the electrical system. Such devices normally incorporate boot-up procedures that involve initializing certain parameters at vehicle start-up time. These parameters are stored in the memory of such controllers even when the vehicle's engine is turned off. So long as the stored energy sources are connected to the electrical system, the devices retain the parameters uploaded during boot-up procedure. In particular, some boot-up procedures implement time delays to inhibit certain operating conditions. For example, some controller-based engine starters inhibit engine cranking for a period of time during which the engine's temperature is raised via heating elements. It would be undesirable if the stored energy sources were disconnected from the vehicle electrical system before such time delays have expired. Accordingly, there is a need for a control device capable of accommodating time delays during certain operating sequences and before disconnecting the stored energy sources from the electrical system.

Under some operating conditions the generator in a vehicle electrical system may provide electrical energy in excess of the system load requirement. Such energy may be used to power auxiliary circuits and devices that are not a part of the primary vehicle electrical system. This is normally accommodated by the use of a dedicated auxiliary output port. Although, the excess energy is available, it would be undesirable to allow such devices to consume energy beyond the capability of the generator since it would deprive the primary system loads of their energy requirement and may cause the primary system voltage to drop to the point of disabling normal operation. Therefore, there is a need for a control device that can provide controllably limited energy to auxiliary output ports.

There are circumstances where it is necessary for the vehicle operator to know the charge status of the stored energy source. For example, a vehicle operator who is uninformed about a discharged battery in the system may shut down the vehicle engine and face a serious problem of not having enough energy to restart the engine. It is also desirable to have a means to predict when a battery needs to be replaced before its actual failure. By providing battery charge status and battery health information to the operator the situations that lead to an electrically disabled vehicle may be avoided. Accordingly, there is a need for a control device that is capable of providing status information concerning the battery state of charge and battery health.

In yet other applications, certain devices in the electrical system need to be constantly connected to an energy source. For example, emergency flashers need to be capable of activation even though the engine is not operating. Accordingly, there is a need for a control device that is capable of detecting device-specific load conditions to remain capable of activation despite battery disconnection from the main vehicle loads.

SUMMARY

The present invention discloses a system and method, which controls the flow of energy between a generator, various electrical loads, and stored energy sources in a vehicle electrical system.

According to a first aspect of the invention, a system is disclosed comprising a generator, an electrical load, a stored energy source, and a control device connected to and in communication with the vehicle electrical system. The control device is configured to monitor and process electrical signals generated by the generator, electrical load, and stored energy source, in order to ascertain certain electrical signatures, and selectively connect or disconnect said generator, electrical loads, and stored energy source upon verification of said electrical signatures.

The control device further includes a processor and sensor modules to monitor and process voltage and current signals generated by the generator, electrical load, and stored energy source in the vehicle electrical system. Preferably, the device monitors amplitude and/or frequency of an output voltage, energize signal, alternating current, and ignition signal, associated with the generator. Additionally, the control device further receives amplitude and frequency signals from sensors which transmit voltage and current signals associated with current flow into and/or out of the stored energy source, and currents drawn by various electrical loads in the vehicle electrical system.

The control device is further configured to process the electrical signals to ascertain certain electrical signatures. Preferably, the control device comprises a processor which is capable of recording temporal records of the electrical signals generated by the generator, electrical load, and stored energy source in the vehicle electrical system. Preferably the control device comprises means for sensing a frequency and/or amplitude of incoming electrical signals and further capable of measuring and transmitting said signals to the processor. The control device processes such electrical signals by comparing them with a pre-determined value for verification purposes.

The control device further comprises a switching system to selectively connect or disconnect a generator, electrical load, or stored energy source, or any combination thereof, with the vehicle electrical system when said electrical signatures have been verified. The switching system incorporates bi-directional semiconductor switch modules. The switching system is further configured to operate in high electrical noise environments encountered in electrical circuits, so as to avoid inadvertent battery connection or disconnection. The control device is further configured to control the switching system to disconnect the battery from the electrical system when the vehicle engine is not operating. Preferably, the control device controllably disconnects the battery from the electrical system upon the expiration of a prescribed time-delay so as to avoid reinitializing the peripheral devices that make up the electrical system. Preferably, the control device is further configured to inhibit said disconnection from the electrical system upon detecting device-specific current fluctuations when the engine is not operating. Preferably, the control device is configured to connect the battery to the vehicle electrical system when an energize signal from an energize line associated with the generator has been determined to indicate that the vehicle electrical system is set to operate.

The switching system further comprises integrated circuit modules with built-in logic for selectively connecting or disconnecting an electrical load with the vehicle electrical system. The system is further configured to incorporate current-limited auxiliary output ports which permit auxiliary devices to be connected to the electrical system. Preferably, the control device controllably limits the amount of energy that can be delivered to the auxiliary devices. Preferably, the control device disconnects the electrical load when a current drawn by said load exceeds a prescribed threshold and connects said load when the vehicle electrical system resets.

The system further includes status indicators in order to provide status information regarding the state of the control device, generator, electrical load, or stored energy source in the vehicle electrical system. Preferably, the control device comprises visual indicators in order to provide status information regarding the state of the battery charge to the vehicle operator.

According to a second aspect of the invention, a method is disclosed for controlling and distributing electrical energy in a vehicle electrical system. The method includes monitoring electrical signals generated by a generator, electrical load, and stored energy source in the vehicle electrical system, processing said signals to ascertain certain electrical signatures, and controllably connecting or disconnecting the generator, electrical load, or stored energy source, or any combination thereof, with the vehicle electrical system when said electrical signatures have been verified.

The method comprises sensing electrical signals generated by the generator, electrical load, and stored energy source. Preferably, the method includes receiving a frequency and/or amplitude of the electrical signals. The method further comprises quantifying the electrical signals received from the generator, electrical load, and stored energy source, and comparing them with a pre-determined value. Preferably, the method includes a step of verification upon which the generator, electrical load, or stored energy source, or any combination thereof, is selectively connected or disconnected with the vehicle electrical system.

The method includes monitoring the output voltage, energize signal, alternating current, and ignition signal associated with the generator. Additionally, the method comprises monitoring the output voltage and current of the electrical load, and the currents flowing into and/or out of the stored energy source. Preferably, the frequency and/or amplitude of said signals are monitored and processed for verification purposes. The method further includes operating a switching system to selectively connect or disconnect the generator, electrical load, or stored energy source, or any combination thereof, with the vehicle electrical system. Preferably, the method includes disconnecting the stored energy source or generator from the vehicle electrical system when a prescribed time delay expires and an alternating current and ignition signal associated with the generator have been determined to indicate a non-operating vehicle engine. Preferably, the method includes inhibiting said disconnection when a current flow associated with the stored energy source has been determined to represent a specific load such as manifested by emergency flashers. Preferably, the method comprises connecting said generator or stored energy source when the vehicle electrical system has been determined to indicate an operating vehicle electrical system. Preferably, the method includes disconnecting the electrical load when a current drawn by said load exceeds a prescribed value, and further connecting said load when the vehicle electrical system has been reset.

The method further includes providing status information regarding the state of the control device, generator, electrical load, or stored energy source in the vehicle electrical system, preferably via specific steady or flashing visual indicators.

The foregoing explanations, descriptions, illustrations, examples, and discussions regarding this invention have been set forth to demonstrate the utility and novelty of this invention and are by no means restrictive of its scope.

DETAILED DESCRIPTION OF THE PRESENTLY PREFERRED EMBODIMENTS

Figure 1:
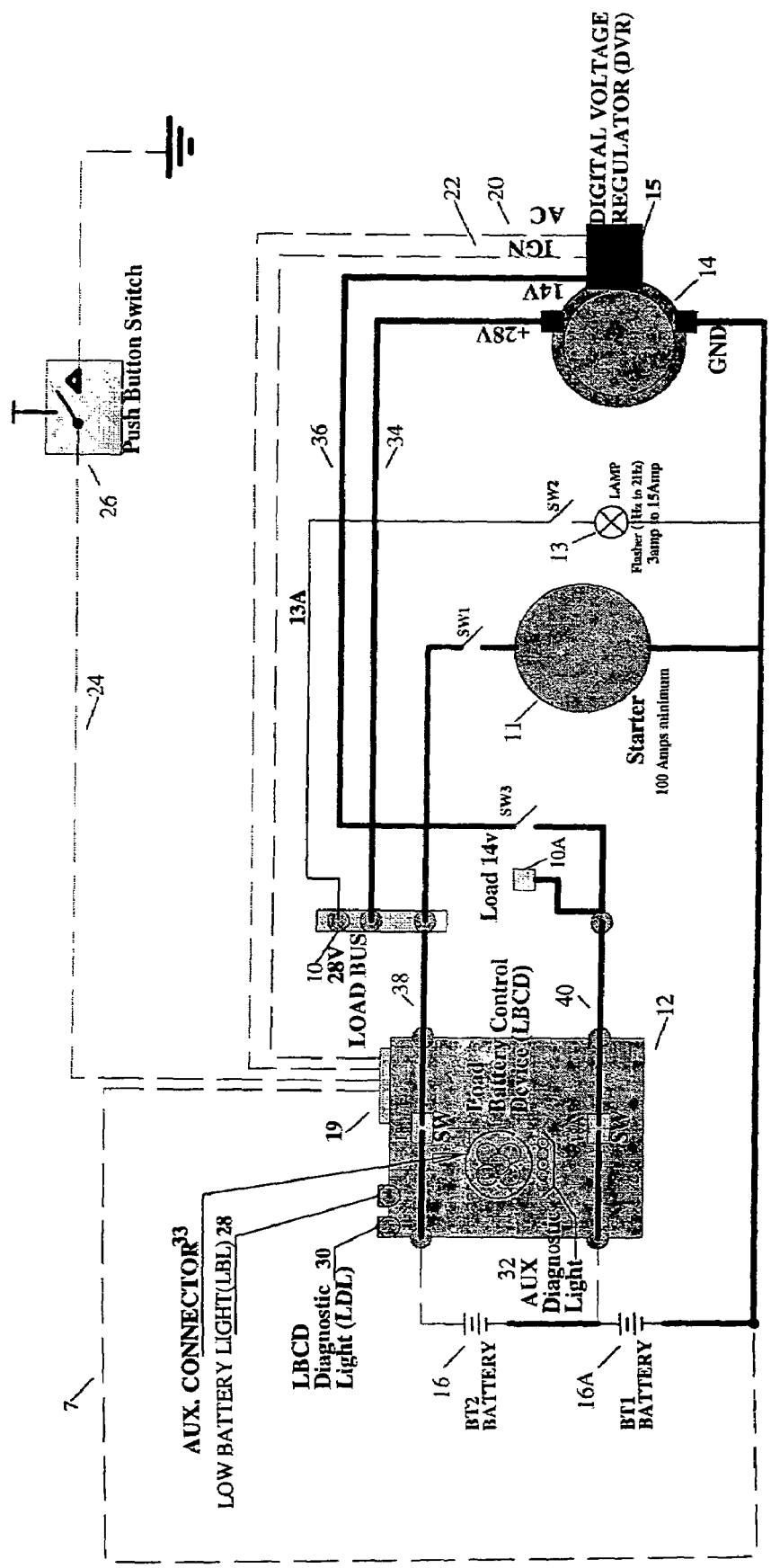
FIG. 1 shows a block diagram of a vehicle system according to a preferred embodiment.

FIG. 1 depicts a block diagram of a vehicle electrical system 9 which includes a preferred load and battery control device (LBCD) 12. An alternator 14 generates electric power for the electrical system loads connected to 10 and 10A when the vehicle engine is running, and one or more batteries 16 and 16A connected via switches 18 and 18A to the vehicle electrical system loads connected to 10 and 10A, respectively, to provide electrical power when the vehicle engine is not running, when the vehicle engine is running but the alternator 14 has become defective, and when the engine is first started.

Embedded in the LBCD 12, are one or more bi-directional semiconductor switching modules (BSSM) 18 and 18A, which are in communication with and are controlled by the LBCD 12 in order to connect or disconnect the batteries and or the alternator from the vehicle electrical system.

LBCD 12 is connected to and is in communication with the alternator through an AC line 20 and an IGN line 22, via a connector 19. LBCD 12 detects and monitors the amplitude and frequency of the signals on these lines in order to determine the state of the electrical system, and in particular, to determine whether or not to disconnect the batteries from the electrical system. In one embodiment, in the absence of any current fluctuations, LBCD 12 disconnects the batteries from the electrical system if there are no signals present on either AC line 20 or IGN line 22 for a period of three (3) minutes.

LBCD 12 is further connected to and is in communication with a push button switch 26 through connector 19, preferably located next to the vehicle operator, via an energize line 24, which functions to connect battery voltage to the electrical system loads. In other embodiments, the push button switch may be of a type that operates by remote control without actual involvement of a vehicle operator.

LBCD 12 is further connected to and is in communication with the alternator via alternator output lines 34 and 36, through which LBCD 12 detects and monitors the voltage outputs of the alternator 14. In one embodiment, the alternator 14 comprises two voltage outputs operating line 34 at 28 Volts and line 36 14 Volts, respectively. LBCD 12 is further connected to system loads via connections 38 and 40, whereby the LBCD detects and monitors the amplitude and frequency of the signals on these lines to determine the status of the system loads. In one embodiment, the LBCD monitors the current fluctuations in conjunction with voltage levels on either AC line 20 or IGN line 22 to determine whether or not to inhibit normal battery disconnection when the vehicle's engine is not operating.

Additionally, LBCD 12 comprises visual indicators such as light emitting diodes (LED) or other type of indicators that provide charge status and diagnostic information to the vehicle operator. In one embodiment, LBCD 12 is connected to a Low Battery Light (LBL) 28 display, preferably located on the LBCD 12, which may be activated to send charge status information to the vehicle operator. It may be operated in the same manner as the standard warning light in automobiles where a warning is sent to the vehicle operator that the battery is undercharged or otherwise defective simply by illuminating the visual display. In other embodiments, the visual display may be operated to display certain visual patterns or text that provides detailed information to the vehicle operator as to the status of the battery and electrical system. LBCD 12 is also connected to an LBCD Diagnostic light (LDL) 30, such as an LED located on the LBCD, that provides diagnostic information pertaining to the status of the LBCD itself. In one embodiment, the visual display may be operated in the same manner as the standard warning light in automobiles where a warning is sent to the vehicle operator that the LBCD is malfunctioning or otherwise defective simply by illuminating the visual display. In other embodiments, the visual display may be operated to display certain visual patterns or text that provides detailed diagnostic information to the vehicle operator as to the status of the LBCD.

LBCD 12 further includes auxiliary output ports through a connector 33, which are monitored and controlled so as to provide current-limited electrical power which may be utilized by external auxiliary devices. In one embodiment, the LBCD provides five (5) auxiliary output ports operating at 28 Volts. LBCD 12 is connected to a visual display such as an auxiliary diagnostic light (ADL) 32, preferably located on the LBCD, that provides diagnostic information pertaining to the status of the auxiliary output ports. In one embodiment, the visual display may be operated in the same manner as the standard warning light in automobiles where a warning is sent to the vehicle operator that excess current was drawn from the specific auxiliary output port, or that the specific output port is malfunctioning or otherwise defective simply by illuminating the visual display. In other embodiments, the visual display may be operated to display certain visual patterns or text that provides detailed diagnostic information to the vehicle operator as to the status of the auxiliary output ports.

Figure 2:
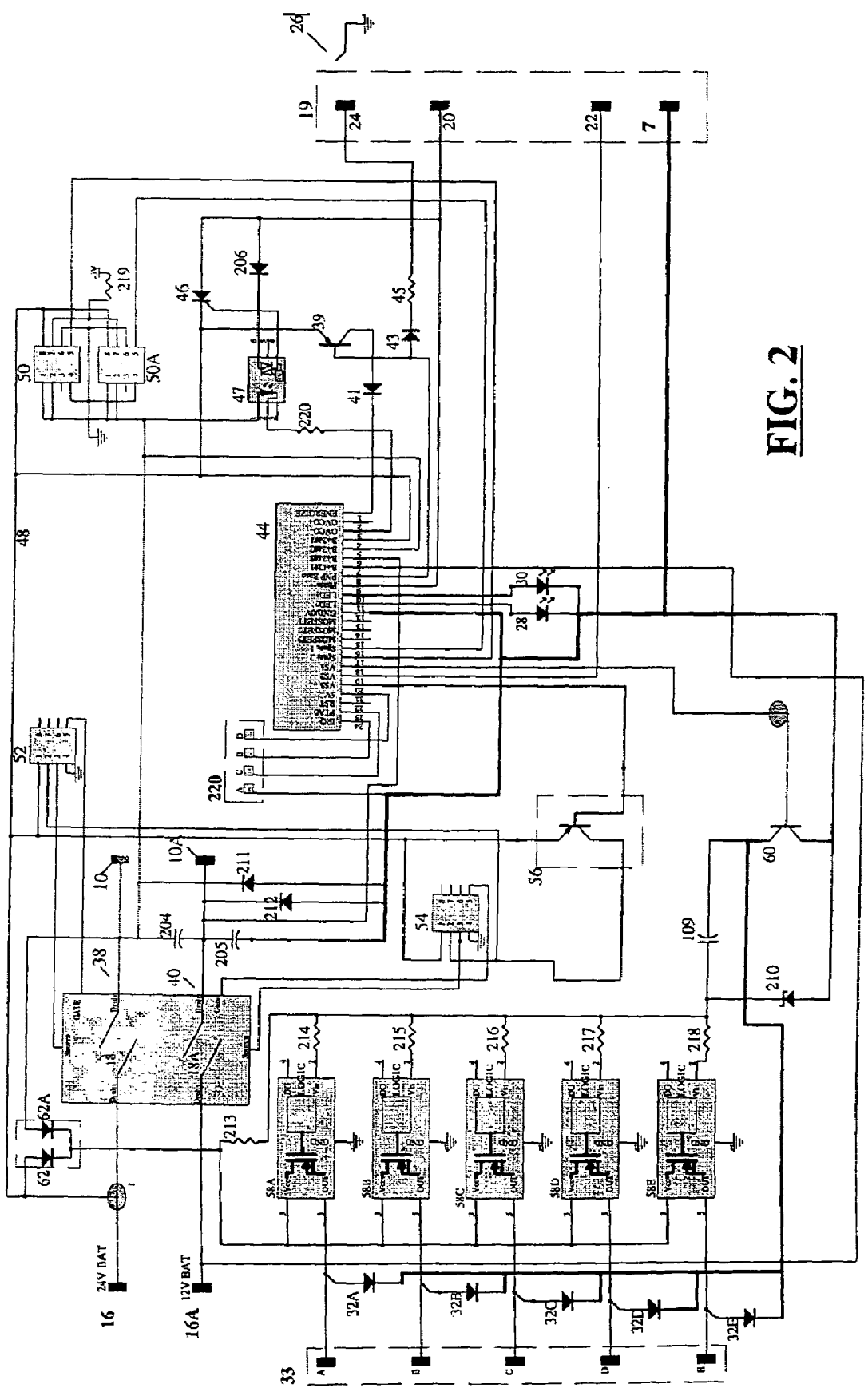
FIG. 2 is a schematic of one preferred LBCD for use in the vehicle electric system of FIG. 1.

FIG. 2 illustrates an embodiment of LBCD 12 as an electrical circuit 42 controlled by a processor module 44. In this embodiment, substantial part of the LBCD's functions may be controlled solely by processor module 44. In other embodiments, multiple processors of the type such as the processor module 44, or other types, may be utilized to operate concurrently in parallel or series configurations to process and control the LBCD functions. The processor module 44 preferably comprises a microprocessor, a processor clock, and a power supply. In one preferred embodiment, the microprocessor is a 68C08 processor having internal flash memory available from Motorola, Inc. of Schaumburg, Ill. The internal clock may be a crystal-type oscillator or other oscillator mechanism known to those practiced in the art, and the power supply may be a discrete or integrated circuit configured to supply the processor module 44 with appropriate DC voltage. It is contemplated that the processor module may be a combination of individual discrete or separate integrated circuits packaged in a single housing or it may be fabricated in a single integrated circuit.

In one embodiment, processor module 44 may be configured to be powered up by momentarily activating the push button switch 26, thereby grounding the energize line 24 in an active-low configuration. Grounding the energize line 24 triggers transistor 39 by grounding its base through diode 43 and resistor 45 causing transistor 39 to conduct, thereby providing battery voltage to processor 44 through diode 41.

Upon power up, processor module 44 holds and maintains the base of transistor 39 grounded until LBCD 12 reaches the end of its shutdown mode of operation. It should be clear to those practiced in the art that the battery voltage is subsequently transformed into a TTL signal for the consumption of processor 44. In other embodiments, processor module 44 may be configured to derive its power in an active-high configuration.

In one embodiment, connector 19 may be configured to connect the AC line 20 from the alternator 14 to the LBCD 12 in order to provide power to disconnected stored energy sources in a vehicle electrical system and to further provide phase information for processor module 44. Specifically, processor module 44 may be configured to control charging current to the battery 16 and 16A from the alternator 14 by switchably controlling power from the AC line 20 through a switch, such as an SCR (silicon controlled rectifier) 46 that feeds the trickle charge/sense line 48 electrically connected with the battery 16 and 16A through the AC line 20. In order to supply the SCR 46 with proper gate signal to turn it on or off, the processor module uses an optocoupler 47. The optocoupler 47 also provides the processor module 44 with significant isolation from the electrical noise inherently generated by the SCR 46. Although the gate control device is shown as an optocoupler 47, other switching mechanisms and control circuits may be used. Additionally, while the SCR 46 is preferred, other controllable devices apparent to those of ordinary skill in the art may be used such as transistors or AC to DC (alternating current to direct current) converters. In the embodiment of FIGS. 1–2, the alternator 14 is preferably generating a three phase AC output and AC line 20 preferably carries a single phase of the three phase AC output. In other embodiments, the alternator may generate other numbers of AC output phases (e.g., six), or two or more phases of the alternator output may be controlled via the processor module to recharge the battery. In these other embodiments, the type of controllable device, such as an SCR, used by the processor module to manage battery recharging may be selected according to the sensitivity and power requirements necessary for the particular vehicle electrical system.

In one embodiment, connector 19 may be configured to connect the IGN line 22 from the alternator 14 to the LBCD 12 in order to provide system information to processor 44. Specifically, processor 44 is in communication with IGN line 22 and monitors the voltage level on this line to determine whether or not the vehicle ignition switch has been activated. In particular, the voltage level on the IGN line 22 is further conditioned for processor consumption by incorporating Zener diode 201 and resistors 202 and 203. In one embodiment, processor 44 monitors the phase signal on the AC line 20 and the voltage level on the IGN line 22 and disconnects the batteries from the vehicle electrical system if either signal ceases to be present for a pre-determined period, for instance three (3) minutes. Significantly, the processor module 44 utilizes the phase signal on the AC line 20 to compute alternator rotational speed which may be used to ascertain alternator integrity or to transmit diagnostic information via LDL 30.

Processor module is also in communication with and in control of the integrated circuit modules 50 and 50A. In one embodiment, these modules are incorporated as current sensors which detect the current flow into and out of stored energy sources in a vehicle electrical system. Specifically, LBCD 12 incorporates modules 50 and 50A and processor 14 utilizes them to determine the amount of current flowing into and out of the batteries 16 and 16A which may be used for various reasons. For instance, processor 14 may be configured to ascertain whether or not there are current fluctuations on the current flowing out of the batteries when the vehicle engine is turned off, as would be the case when a circuit load, such as the flasher 13, is activated, and if so, to inhibit LBCD 12 from disconnecting the batteries from the vehicle electrical system. In another instance, processor 14 may be configured to utilize these modules to detect the current flowing into the batteries and comparing them with the power capacity of the alternator 14. In a preferred embodiment, processor 14 activates the LBL 28 if the corresponding current flows into batteries 16 and 16A are above pre-selected threshold values. Yet in other embodiments, processor 14 may be configured to use the current information, so provided, to override normal battery disconnection during vehicle startup time when the batteries are supplying starter 11 mechanism with electrical power in order to crank the vehicle engine.

In one embodiment, two BSSMs 18 and 18A, one for the 28 Volt system and the 14 Volt system, respectively, are embedded in LBCD 12 in order to controllably connect and disconnect the batteries 16 and 16A from the vehicle electrical system. The BSSMs are driven by integrated circuit modules 52 at 54 which are, in turn, triggered by integrated circuit driver 56. Processor module 44 may be configured to replace the BSSM's own processor such that it is in communication with and in control of integrated circuit driver 56 to effectuate the aforementioned connection and disconnection of the batteries based on its own inputs.

In one embodiment, LBCD 12 comprises auxiliary output ports separate from the standard load connections to the vehicle electrical system in order to provide controlled auxiliary power to external devices via connector 33. Such output ports have built-in logic to limit the amount of current that can be drawn from each port. Any attempt to draw higher current from any of the output ports will cause that particular output port to automatically shut itself off and will remain off-line until the system is reset. LBCD 12 may be configured to set the voltage of such auxiliary output ports at various voltages, including those at which the vehicle electrical system is operating. In other embodiments, the amount of current that may be drawn from such output ports may be set at different values.

Further, LBCD12 may be configured to provide visual indicators, such as auxiliary diagnostic light (ADL) 32 or other type of displays, that may be positioned in the field of view of the vehicle operator that transmit information regarding the status of each of such auxiliary output ports. These visual displays may be operated in the same manner as the warning light in automobiles where a warning light is sent to the vehicle operator that the particular output port is overloaded or otherwise defective simply by illuminating the visual indicator, or they may be operated to display certain patterns that provide detailed information to the vehicle operator as to the status of the output ports and the electrical system.

LBCD 12 may be configured to incorporate diodes that permit the auxiliary output ports to draw power from the alternator in circumstances where the batteries are disconnected from the vehicle electrical system. Under normal operating conditions, the auxiliary output ports draw their power from the batteries 16 and 16A. However, if for some reason such as those discussed above, the batteries become disconnected from the electrical system, the output ports are redirected to the alternator and may draw their power directly from the power generated by the alternator. Furthermore, LBCD 12 may be configured such that the auxiliary output ports may provide power even when LBCD 12 is not powered up. For example, when LBCD 12 disconnects the batteries after 3 minutes following vehicle engine shutdown, LBCD 12 itself goes off-line, but the auxiliary output ports through connector 33 remain connected to the batteries.

In a preferred embodiment, LBCD 12 incorporates integrated circuit modules 58A, 58B, 58C, 58D, and 58E, to provide five auxiliary output ports each of which is set at 28 Volts via connector 33. Furthermore, the output current of each port is limited to a range between 15 to 25 Amperes, preferably 20 Amperes, depending on the operating temperature. Upon completion of LBCD 12 power-up procedure, auxiliary output ports go on-line and each can provide power at the aforementioned voltage and current to external devices via connector 33. Concurrently, processor 44 activates transistor 60, thereby grounding the same and causing the ADL 32 to illuminate indicating that the output ports are ready and capable of providing power. Such power is drawn either from the batteries 16 and 16A or the alternator 14 depending on whether the batteries are connected or disconnected from the vehicle electrical system, respectively. When the batteries 16 and 16A are connected to the electrical system, both diodes 62 and 62A conduct and provide power to the auxiliary output ports. However, if the batteries are severely undercharged or otherwise incapable of providing power, the BSSMs 18 and 18A are triggered and the batteries will be disconnected from the electrical system, but the auxiliary output ports will remain powered from the alternator 14 through Diode 62A.

Utilizing the system 9 described above, one embodiment of the operation of LBCD 12 is now described. To start the vehicle, the operator must initiate the vehicle startup procedure by momentarily activating the push button switch 26 in order to turn on LBCD 12. This is due to the fact that LBCD 12, upon expiration of a pre-selected period, for example three minutes, disconnects the batteries from the vehicle electrical system and the batteries remain disconnected until the next vehicle startup procedure. Upon momentarily activating switch 26, the energize line 24 triggers transistor 39 by grounding its base through diode 43 and resistor 45, thereby turning on LBCD 12. At this time, LBCD 12 enters its startup mode of operation. Upon power up, LBCD 12 holds and maintains the base of the transistor 39 at ground level until LBCD 12 reaches the end of its shutdown mode of operation. Immediately after it has been turned on, LBCD 12 executes its own startup procedure which includes controllably activating the BSSMs 18 and 18A, thereby connecting the batteries to the electrical system. LBCD 12 further controllably activates LDL 30 which displays a particular pattern and color of flashing light, for example a flashing green light, indicating that the electrical system is in a startup mode of operation. The vehicle operator must then continue with the vehicle startup procedure by turning on the vehicle ignition switch, at which time LDL 30 displays a different pattern and color of flashing light, for example a steady green light. This will engage the starter mechanism 11 to crank and start the engine. However, as discussed above, some electrical devices such as the starter mechanism 11 include a "glow plug" device which prevents the former from turning on for a period of time during which the latter utilizes heating elements to heat the vehicle's engine. LBCD 12 monitors the AC line 20 and the IGN line 22 and recognizes that the electrical system is still in a startup mode of operation, i.e., the alternator 14 is not generating power. Accordingly, LBCD 12 maintains battery connection for a long enough period for the "glow plug" device to complete its startup procedure before allowing the starter mechanism 11 to turn on. Although in this embodiment, there are two separate switches which must be activated to start the vehicle, in other embodiments, system 9 may be configured such that only one switch will effectuate the same task. Furthermore, although system 9 incorporates manual mechanical switches, it is contemplated that other types of electromechanical, opto-electronic, or remote-control devices may be utilized.

During vehicle startup procedure, DVR 15 (digital voltage regulator that controls alternator operation) goes through its typical startup procedure that is completed when the engine is running and the alternator system is checked for integrity. In a single voltage vehicle electrical system, e.g. 28 Volts only, the LBCD can be operated in conjunction with any voltage regulator, including an analog voltage regulator, capable of regulating alternator voltage when a battery is absent from the circuit. Suitable voltage regulators include the N3106 regulator for single voltage operation and the N3212 or the N3207 digital dual voltage regulators, which are available from C.E. Niehoff & Co. of Evanston, Ill. The regulator 15 excites the alternator field to produce output power.

During vehicle startup procedure, LBCD 12 also monitors the current flowing out of the batteries 16 and 16A via the sensor modules 50 and 50A, to ascertain whether any current fluctuation exists. If so, LBCD 12 overrides any battery disconnection command for it recognizes that an electrical device such as the flasher 13 has been activated. Under these circumstances, LBCD 12 recognizes that the batteries must remain connected to the electrical system as they are the only source of energy for the flasher 13. LBCD 12 monitors the phase signal on the AC line 20 to ascertain alternator rotational speed (RPM) and upon reaching a threshold value, the LBCD 12 enters its normal operation mode.

LBCD's normal operation comprises monitoring the electrical system voltage. If LBCD 12 determines that the system voltage is below a threshold value, for example 20.5 Volts for a 28 Volt operating system, it becomes apparent that the load created by recharging the battery exceeds the generator capacity and LBCD 12 disconnects the batteries 16 and 16A from the vehicle electrical system by activating the BSSMs 18 and 18A. At this time LDL 30 is activated and displays a particular pattern and color of flashing light, for example a rapidly flashing green light, indicating that the electrical system is in a batteryless mode of operation. When BSSM 18 disconnects the battery 16 from the alternator 14 and the rest of the load bus 10 circuit, the system voltage is expected to return to its regulated setting. The alternator 14 is now operating either without any battery in the system or, in embodiments where there are multiple batteries in the vehicle electrical system, it is operating with an auxiliary battery that is now also isolated from the disconnected battery 16. In this mode the LBCD 12 actively controls the trickle charge to the disconnected battery by controlling the SCR 46 in the circuit 42 to provide a programmed charge to the disconnected battery over the trickle charge/sense line 48. Once the LBCD detects that the battery 16 has been charged, it will controllably activate the BSSM 18 to reconnect the battery 16 to the load bus 10 circuit and the LDL 30 will be instructed to display a particular pattern and color of flashing light, for example a flashing green light, indicating that the battery is now connected to the electrical system and possesses an acceptable charge.

Also during normal operation, LBCD 12 monitors the electrical current flowing into and out of the batteries by communicating and controlling modules 50 and 50A. In one instance, LBCD 12 detects the current flowing into the batteries and compares them with the power capacity of the alternator 14. If the corresponding current flows into batteries 16 are above pre-selected threshold values, LBCD 12 controllably activates LBL 28 which displays a particular pattern and color of flashing light, for example a flashing red light, indicating that the batteries are undercharged or otherwise defective, thereby notifying the vehicle operator that shutting off the engine may present a serious problem of the electrical system not having enough energy to restart the vehicle. It should be mentioned that LBCD 12, determines the actual amount of current flowing into and out of the batteries 16 and 16A, which may be used to provide detailed information to the vehicle operator as to the status of the batteries.

Furthermore, once the LBCD 12 enters its normal operation mode, it controllably triggers transistor 60, which causes the ADL 32 to turn on, signifying that the auxiliary output ports have been reset and are ready to receive auxiliary devices and capable of providing them with current-limited output power. In a preferred embodiment, there are five (5) auxiliary output ports each of which can provide power to auxiliary devices at 28 Volts and 15 to 25 Amperes, preferably 20 Amperes. Any attempt to draw higher current from any of the output ports will cause that particular output port to automatically shut itself off and will remain off-line until the system is reset. Furthermore, the LBCD 12 controllably activates the ADL 32 and turns off the LED associated with that particular output port, indicating that it has been turned off. Furthermore, LBCD 12 is capable of providing current-limited power through the auxiliary output ports even when the batteries 16 and 16A are disconnected from the electrical system, as diodes 62 and 62A are configured in such a way as to provide battery power to the auxiliary output ports regardless of the state of the BSSMs 18 and 18A.

LBCD 12 enters its shutdown mode of operation when the vehicle operator turns off the ignition switch. LBCD 12 monitors the AC line 20 and the IGN line 22 and recognizes that the electrical system is in a shutdown mode of operation, i.e., the alternator 14 is not generating power and the IGN line 22 has been grounded. Accordingly, LBCD 12 maintains battery connection for a pre-selected period, preferably three minutes, in the event that the vehicle operator decides to restart the vehicle. Maintaining battery connection prevents resetting and thereby reinitiating the startup procedures of the electrical devices, such as the starter mechanism 11. Furthermore, as in the startup mode of operation, LBCD 12 is in communication and control of the current sensor modules 50 and 50A, in order to monitor the current fluctuations of the current flowing out of the batteries 16 and 16A, and in the event that there exists such fluctuations as those relating to devices such as the flasher 13, LBCD 12 maintains battery connection until either the flasher is turned off or the batteries are completely depleted. Upon completion of the LBCD 12 shutdown mode of operation, LBCD 12 triggers 39 and causes itself to turn off by terminating its supply of power.

Figure 3:
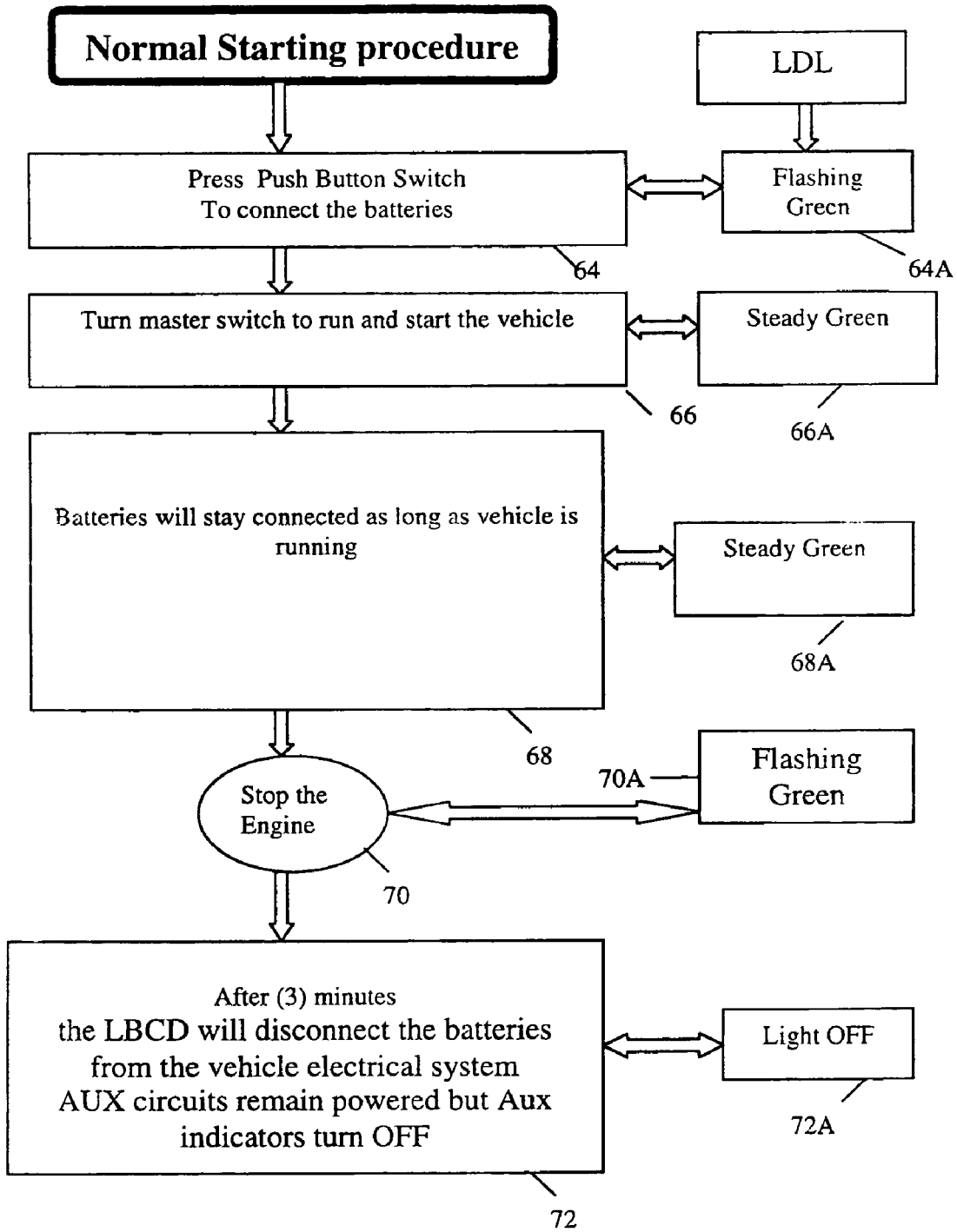
FIGS. 3 through 7 are flow charts illustrating preferred methods of controlling and distributing electrical energy in the electrical system of FIG. 1.

FIGS. 3 through 7 are flow chart examples of implementing the LBCD 12 operating features. FIG. 3 shows an example of how LBCD 12 may be implemented during normal startup. The system is turned on by the vehicle operator momentarily activating the push button switch 26 at step 64. This causes the processor module 44 of the LBCD 12 to receive power from the batteries 16 and 16A at which time it executes its startup procedure. Processor module 44 thereafter activates the BSSMs 18 and 18A thereby connecting the batteries 16 and 16A to the vehicle electrical system. Processor module also begins monitoring the AC line 20 and the IGN line 22 to ascertain the system status. Processor module 44 also activates LDL 30 causing it to display a flashing green light, at step 64A, indicating that the LBCD 12 has been turned on. The vehicle operator then activates the vehicle ignition switch and, upon the expiration of the "glow plug" waiting period, proceeds to start the vehicle by engaging the starter mechanism 11. Processor module 44 monitors the phase signal on the AC line 20, continuously computing the RPM of the alternator 14, and upon verifying a programmed threshold RPM, for example 1500 RPM, it executes its normal mode of operation, at which time LDL 30 displays a steady green light at step 66A.

Processor module 44 proceeds with monitoring and measuring the system voltage by detecting the voltages at lines 38 and 40 for the respective load bus voltages of 28 Volts and 14 Volts. Assuming that the voltages at sense lines 38 and 40 are above a pre-determined threshold, the LDL 30 will continue to display a steady green light at step 68A to indicate that the electrical load bus 10 and 10A is behaving normally and that the batteries 16 and 16A are not drawing such a large charge current that the system voltages are adversely affected. If, however, processor module 44 detects a system voltage which falls below the programmed threshold, it disconnects the corresponding battery(s) by activating the particular BSSM(s) and upon detecting excess generator power, commences trickle charging said battery(s).

When the vehicle is stopped and the engine is turned off, the alternator RPM drops to zero, and the processor module 44 executes its shutdown procedure. It activates LDL 30 to display a flashing green light at step 70A and turns off the ADL 32, signifying that the auxiliary output ports are drawing their power directly from the batteries. Thereafter, in the absence of any current fluctuation sensed via the modules 50 and 50A, LBCD 12 disconnects the batteries 16 and 16A from the vehicle electrical system upon the expiration of a pre-selected time delay, for example, three minutes, thereby, shutting itself off, and along with it, the LDL 30, at step 72.

Figure 4:
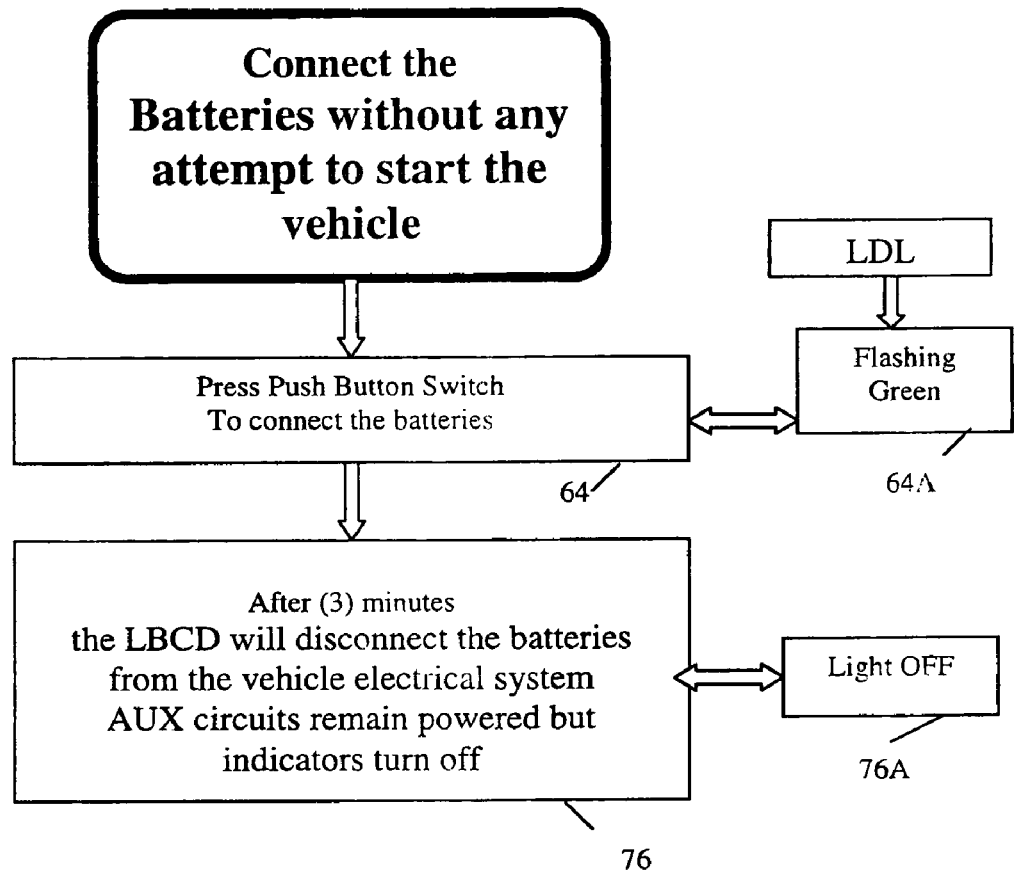

FIG. 4, illustrates a flow chart example of implementing the LBCD 12 where the vehicle electrical system is turned on without turning on the ignition switch, i.e., without starting the vehicle engine. Upon activating the momentary push button switch 26, processor module 44 turns on and detects the AC line 20 and the IGN line 22 and recognizes that the ignition switch is not activated. Processor module 44, thereafter, activates LDL 30 to display a flashing green light at step 64A, signify that the batteries 16 and 16A are connected to the electrical system. However, since the IGN line 22 is not on, the ADL 32 remains in the off state but one may still draw power from the auxiliary out put ports 33. Upon expiration of the pre-selected time delay and in the absence of any current fluctuations, the LBCD 12 disconnects the batteries 16 and 16A from the electrical system turning itself off, which in turn turns off the LDL 30 at step 76.

Figure 5:
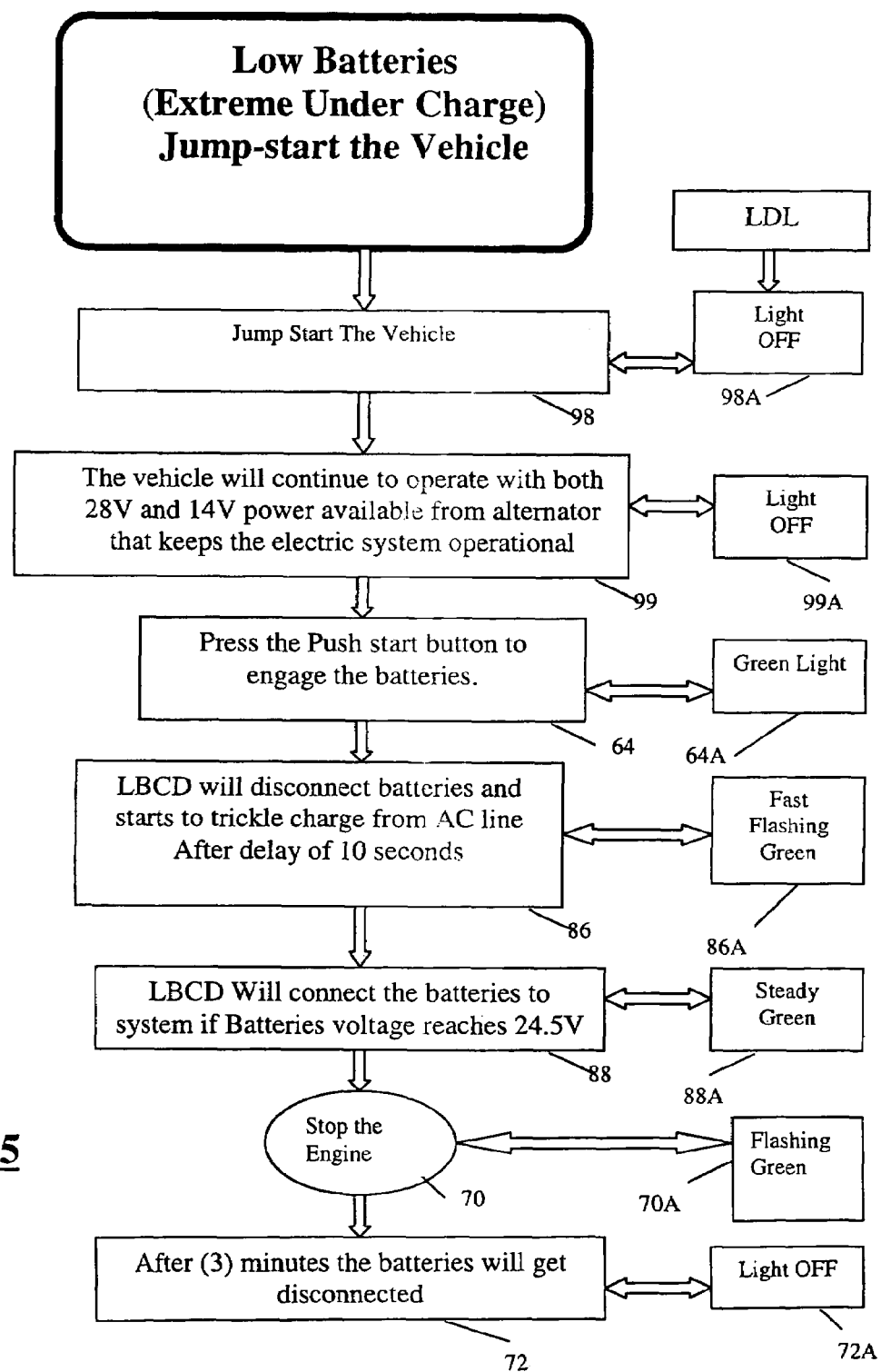

FIG. 5, illustrates a flow chart example of implementing the LBCD 12 where the batteries 16 and 16A are in an extreme undercharge state, such that the vehicle has to be provided with an auxiliary starting means to crank the engine, i.e., jump-start the engine, at step 98. After the jump starting power is disconnected, alternator 14 provides electrical power to the vehicle electrical system in a state of batteryless operation at step 99. Upon momentarily activating the push button switch 26, LBCD 12 turns on and processor module 44 activates LDL 30 to display a steady green light at step 64A. Due to the presence of severely undercharged batteries 16 and 16A, it is expected that the system voltage may be exceedingly low, and processor module 44 will activate the BSSMs 18 and 18A to disconnect the batteries 16 and 16A from the electrical system, thereby activating LDL 30 to display a rapidly flashing green light, and upon ascertaining available alternator power, commences trickle charging the disconnected batteries after a pre-selected time period, for example ten seconds, at step 86. Upon recharging the batteries through trickle charging and determining that the batteries 16 and 16A have been recharged to a voltage level above a programmed value, for example 24.5 Volts, the processor module 44 activates the BSSMs to reconnect the batteries to the electrical system and LDL 30 will display a steady green light at step 88A. Shutting down the vehicle's engine will be recognized by the processor module 44 and accordingly said module will activate the LDL 30 to display a flashing green light at step 70A, and in the absence of any current fluctuations on the current flowing out of the batteries, sensed via the current sensor modules 50 and 50A, processor module executes its shutdown procedure and upon the expiration of the pre-selected time delay, it will shut itself off along with LDL 30 at step 72.

Figure 6:
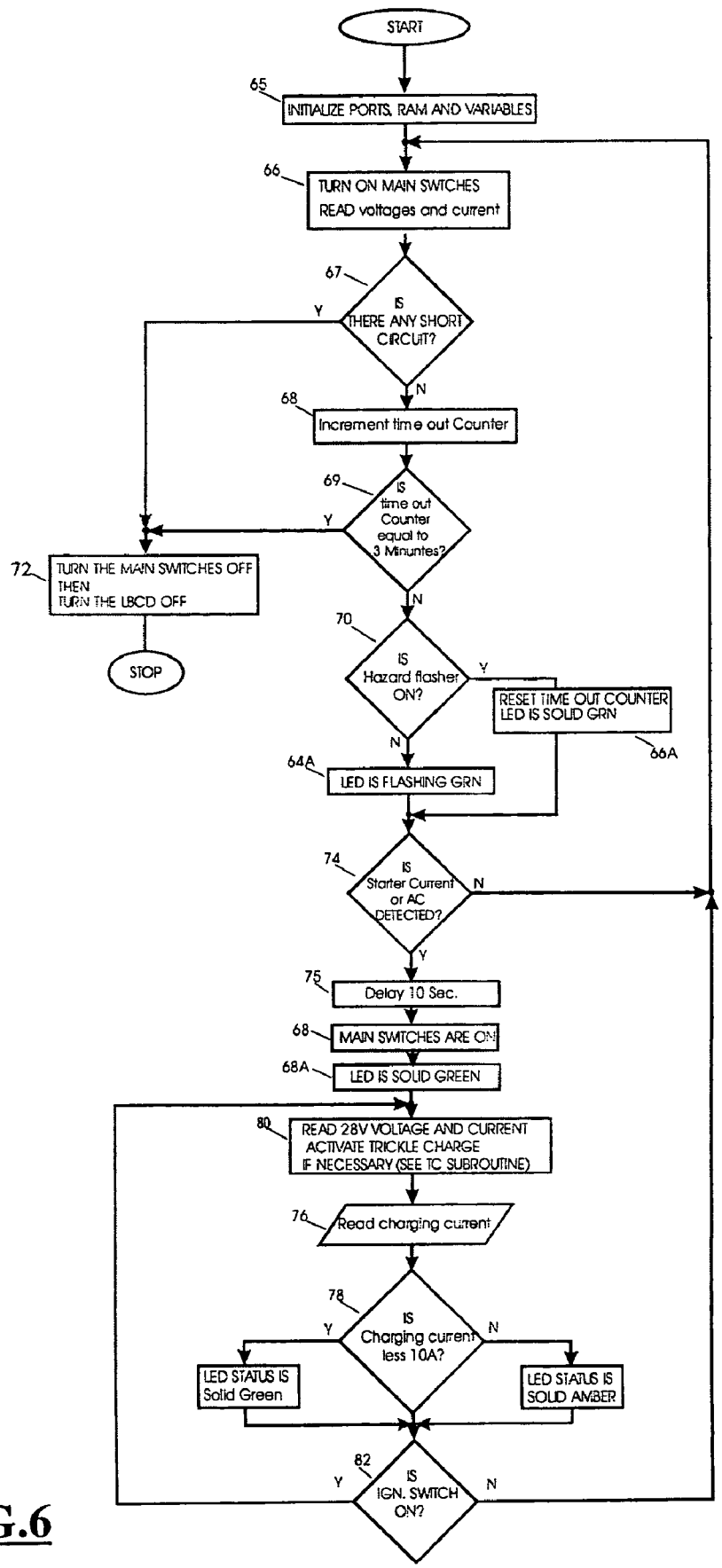

FIG. 6 is a flow chart of the LBCD 12 system software. The system is turned on by the vehicle operator momentarily activating the push button switch 26. This causes the processor module 44 of the LBCD 12 to receive power from the batteries 16 and 16A at which time it executes its startup procedure. Processor module 44 thereafter activates the BSSMs 18 and 18A, thereby connecting the batteries 16 and 16A to the vehicle electrical system. The processor module 44 checks the BSSMs 18 and 18A for short circuit current at step 67. If short circuit current is detected the BSSMs 18 and 18A are immediately disconnected and the LBCD 12 is turned off and LDL 30 is turned off. If no short circuit is detected by the BSSMs the processor module monitors for a defined priority load sich as a flasher circuit in step 70. If the priority circuit is detected, the timer counter is latched at step 66A and the LDL 30 is set to steady green. There will be no three minute timeout unless the priority circuit is later detected to have been turned off. If there is no priority circuit active, the processor module monitors the BSSM for starter motor current in Step 74. The vehicle operator then activates the vehicle ignition switch on line 22 and after expiration of the "glow plug" waiting period, proceeds to start the vehicle by engaging the starter mechanism 11. During this time the Processor module monitors also the phase signal on the AC line 20, continuously computing the RPM of the alternator 14, and upon verifying a programmed threshold RPM, for example 1500 RPM, it executes its normal mode of operation, at which time LDL 30 displays a steady green light at step 68A.

Processor module 44 proceeds with monitoring and measuring the system voltage by detecting the voltages at lines 38 and 40 for the respective load bus voltages of 28 Volts and 14 Volts. Assuming that the voltages at sense lines 38 and 40 are above a pre-determined threshold, the LDL 30 will continue to display a steady green light at step 68A to indicate that the electrical load bus 10 and 10A is behaving normally and that the batteries 16 and 16A are not drawing such a large charge current that the system voltages are adversely affected. When the vehicle is stopped and the engine is turned off, the alternator RPM drops to zero, and the processor module 44 executes its shutdown procedure. It activates LDL 30 to display a flashing green light and turns off the ADL 32, signifying that the auxiliary output ports are drawing their power directly from the batteries. Thereafter, in the absence of any current fluctuation sensed via the modules 50 and 50A, LBCD 12 disconnects the batteries 16 and 16A from the vehicle electrical system upon the expiration of a pre-selected time delay, for example, three minutes, thereby, shutting itself off, and along with it, the LDL 30 at step 72.

If, during normal operation, processor module 44 detects a system voltage which falls below the programmed threshold, it disconnects the corresponding battery(s) by activating the particular BSSM(s) and upon detecting excess generator power, commences trickle charging said battery(s). This procedure takes place in the trickle charge subroutine FIG. 7.

Figure 7:
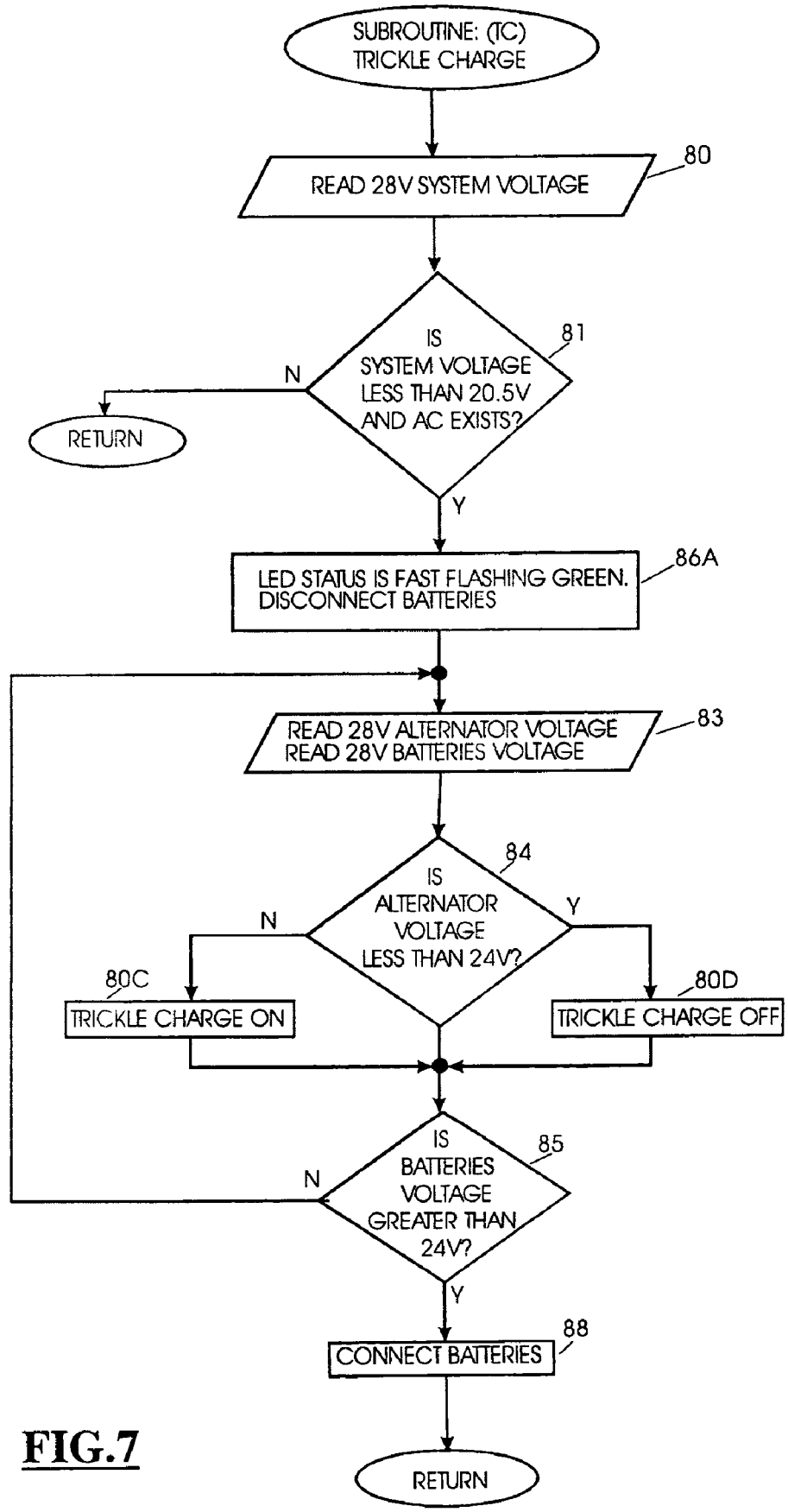

FIG. 7 is a flow chart of the trickle charge subroutine that operates when the batteries 16 and 16A are in a low voltage state and the BSSMs 18 and 18A have disconnected the batteries. Initially, the alternator 14 supplies the electrical system with electrical power with the batteries in circuit. The system voltage at line 38 is read in step 80 and compared in step 81 to a programmed low voltage reference, for example 20.5V. If the system voltage is below this, the system is checked for an AC signal on line 20 and, if present, activates the BSSMs 18 and 18A to disconnect batteries 16 and 16A from the electrical system. The LDL 30 displays a fast flashing green light at step 86A. Step 83 checks the alternator voltage at line 38 to determine is the alternator 14 has recovered to supply 24V or more with the batteries disconnected. If yes, the trickle charge is activated at step 84C on line 48 that also monitors the battery voltage. If the alternator 14 output in batteryless operation should drop below 24V the trickle charge circuit is turned off at step 84D until the voltage recovers to at or above 24V. When the battery voltage on line 48 rises to 24V at step 85 the command to connect the batteries is given at step 88 and the BSSMs connect battery 16 and 16A into the electrical system. The subroutine then returns to the main program.

The examples and illustrations have been used to assist the reader with understanding this invention and not intended to limit the scope of it. It is the following claims, including all equivalents, which are intended to define the scope of this invention.

What is claimed is:

1. A system for controlling and distributing electrical energy in a vehicle electrical system, comprising:
   a generator;
   an electrical load;
   a stored energy source; and
   a control device connected to and in communication with the vehicle electrical system, generator, electrical load, and stored energy source;
   said control device monitoring electrical signals generated by the generator, electrical load, and stored energy source, and processing the electrical signals to ascertain certain electrical signatures, and selectively connecting or disconnecting the generator, electrical load, or stored energy source, or any combination thereof, with the vehicle electrical system when said electrical signatures have been verified.

2. The system of claim 1, wherein the control device further comprises means for sensing a frequency and amplitude of the electrical signals generated by said generator, electrical load, and stored energy source in the vehicle electrical system.

3. The system of claim 2, wherein the means for sensing a frequency and amplitude of the electrical signals generated by said generator, electrical load, and stored energy source in the vehicle electrical system comprises:
(a) a processor capable of recording temporal records of said signals; and
(b) sensors capable of measuring and transmitting voltage and current signals from said generator, electrical load, and stored energy source in the vehicle electrical system to the processor.

4. The system of claim 1, wherein the control device comprises means for selectively connecting or disconnecting a generator or stored energy source with a vehicle electrical system comprising:
to disconnect the generator or stored energy source from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine;
to inhibit said disconnection of the generator or stored energy source from the vehicle electrical system when a current flow associated with the stored energy source has been determined to be cyclical; and
to connect the generator or stored energy source to the vehicle electrical system when an energize signal from an energize line associated with the generator has been determined to indicate an operating vehicle electrical system, wherein the existence of a voltage at the energize line indicates an operating vehicle electrical system.

5. The system of claim 1, wherein the control device comprises means for selectively connecting or disconnecting an electrical load from the vehicle electrical system comprising:
to disconnect the electrical load when a current drawn by said load exceeds a prescribed threshold; and
to connect said load when an ignition signal associated with the generator has been determined to indicate an operating vehicle electrical system when it follows the absence of the ignition signal.

6. The system of claim 4, wherein the means for selectively connecting or disconnecting a generator or stored energy source comprises a bi-directional semiconductor switch module.

7. The system of claim 5, wherein the means for selectively connecting or disconnecting an electrical load comprises integrated circuit modules with built-in logic to limit the current drawn by said load.

8. The system of claim 1, further comprising means for generating a status signal in response to connection or disconnection of a generator, electrical load, or stored energy source with the vehicle electrical system.

9. The system of claim 8, wherein the means for generating a status signal comprises a flashing visual indicator.

10. A system for controlling and distributing electrical energy in a vehicle electrical system, comprising:
means for generating electrical energy;
an electrical load;
means for storing energy; and
means for controlling said means for generating electrical energy, electrical load, and means for storing energy, by monitoring electrical signals generated by said means for generating electrical energy, electrical load, and means for storing energy, and processing said electrical signals to ascertain certain electrical signatures, and selectively connecting or disconnecting said means for generating electrical energy, electrical load, and means for storing energy, or any combination thereof, with the vehicle electrical system when said electrical signatures have been verified.

11. The system of claim 10, wherein the means for controlling the means for generating electrical energy, electrical load, and means for storing energy further comprises a sensor that detects a frequency and amplitude of said electrical signals.

12. The system of claim 11, wherein the sensor comprises:
(a) a processor capable of recording temporal records of said signals; and
(b) means for measuring and transmitting voltage and current signals from said means for generating electrical energy, electrical load, and means for storing energy in the vehicle electrical system to the processor.

13. The system of claim 10, wherein the means for controlling the means for generating electrical energy, electrical load, and means for storing energy further comprises a bi-directional semiconductor switch module:
to disconnect the means for generating electrical energy or means for storing energy from the vehicle electrical system when a prescribed time delay expires and an alternating current and ignition signal associated with the means for generating electrical energy have been determined to indicate a non-operating vehicle engine wherein the absence of either the alternating current or ignition signal indicates a non-operating vehicle engine;
to inhibit said disconnection of the means for generating electrical energy or means for storing energy from the vehicle electrical system when a current flow associated with the means for storing energy has been determined to be cyclical; and
to connect the means for generating electrical energy or means for storing energy to the vehicle electrical system when an energize signal from an energize line associated with the means for generating electrical energy has been determined to indicate an operating vehicle electrical system, wherein the existence of a voltage at the energize line indicates an operating vehicle electrical system.

14. The system of claim 10, wherein the means for controlling the means for generating electrical energy, electrical load, and means for storing energy comprises integrated circuit modules with built-in logic:
to disconnect the electrical load when a current drawn by said load exceeds a prescribed threshold; and
to connect said load when an ignition signal associated with the means for generating electrical energy has been determined to indicate an operating vehicle electrical system when it follows the absence of the ignition signal.

15. A system for controlling and distributing electrical energy from a generator in a vehicle electrical system, comprising:
an electrical load;
a stored energy source; and
a control device connected to and in communication with the vehicle electrical system, generator, electrical load, and stored energy source;
said control device monitoring electrical signals generated by the generator, electrical load, and stored energy source, and processing the electrical signals to ascertain certain electrical signatures, and transferring electrical energy available from the generator to the electrical load or stored energy source, or any combination thereof, when said electrical signatures have been verified.

16. The system of claim 15, wherein the control device further comprises means for sensing a frequency and amplitude of the electrical signals generated by said generator, electrical load, and stored energy source in the vehicle electrical system.

17. The system of claim 16, wherein the means for sensing a frequency and amplitude of the electrical signals generated by said generator, electrical load, and stored energy source in the vehicle electrical system comprises:
    (a) a processor capable of recording temporal records of said signals; and
    (b) sensors capable of measuring and transmitting voltage and current signals from said generator, electrical load, and stored energy source in the vehicle electrical system to the processor.

18. The system of claim 15, wherein the control device comprises means for transferring electrical energy available from the generator to the electrical load or stored energy source comprising:
    to disconnect the generator from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine;
    to inhibit said disconnection of the generator from the vehicle electrical system when a current flow associated with the stored energy source has been determined to be cyclical; and
    to connect the generator to the vehicle electrical system when an energize signal from an energize line associated with the generator has been determined to indicate an operating vehicle electrical system, wherein the existence of a voltage at the energize line indicates an operating vehicle electrical system.

19. The system of claim 18, wherein the means for transferring electrical energy available from the generator to the electrical load or stored energy source comprises a bi-directional semiconductor switch module, wherein said bi-directional semiconductor switch module is controllably turned on or off facilitating said energy transfer from said generator.

20. A system for controlling and distributing electrical energy from a stored energy source in a vehicle electrical system, comprising:
    a generator;
    an electrical load; and
    a control device connected to and in communication with the vehicle electrical system, generator, electrical load, and stored energy source;
    said control device monitoring electrical signals generated by the generator, electrical load, and stored energy source, and processing the electrical signals to ascertain certain electrical signatures, and transferring electrical energy available from the stored energy source to the generator or electrical load, or any combination thereof, when said electrical signatures have been verified.

21. The system of claim 20, wherein the control device further comprises means for sensing a frequency and amplitude of the electrical signals generated by said generator, electrical load, and stored energy source in the vehicle electrical system.

22. The system of claim 21, wherein the means for sensing a frequency and amplitude of the electrical signals generated by said generator, electrical load, and stored energy source in the vehicle electrical system comprises:
    (a) a processor capable of recording temporal records of said signals; and
    (b) sensors capable of measuring and transmitting voltage and current signals from said generator, electrical load, and stored energy source in the vehicle electrical system to the processor.

23. The system of claim 20, wherein the control device comprises means for transferring electrical energy available from the stored energy source to the generator or electrical load comprising:
    to disconnect the stored energy source from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine;
    to inhibit said disconnection of the stored energy source from the vehicle electrical system when a current flow associated with the stored energy source has been determined to be cyclical; and
    to connect the stored energy source to the vehicle electrical system when an energize signal from an energize line associated with the generator has been determined to indicate an operating vehicle electrical system, wherein the existence of a voltage at the energize line indicates an operating vehicle electrical system.

24. The system of claim 23, wherein the means for transferring electrical energy available from the stored energy source to the generator or electrical load comprises a bi-directional semiconductor switch module, wherein said bi-directional semiconductor switch module is controllably turned on or off facilitating said energy transfer from said stored energy source.

25. A system for controlling and distributing electrical energy through an electrical load in a vehicle electrical system, comprising:
    a generator;
    a stored energy source; and
    a control device connected to and in communication with the vehicle electrical system, generator, electrical load, and stored energy source;
    said control device monitoring electrical signals generated by the generator, electrical load, and stored energy source, and processing the electrical signals to ascertain certain electrical signatures, and transferring electrical energy available from the generator or stored energy source, or any combination thereof, to the electrical load when said electrical signatures have been verified.

26. The system of claim 25, wherein the control device further comprises means for sensing a frequency and amplitude of the electrical signals generated by said generator, electrical load, and stored energy source in the vehicle electrical system.

27. The system of claim 26, wherein the means for sensing a frequency and amplitude of the electrical signals generated by said generator, electrical load, and stored energy source in the vehicle electrical system comprises:
    (a) a processor capable of recording temporal records of said signals; and (b) sensors capable of measuring and transmitting voltage and current signals from said generator, electrical load, and stored energy source in the vehicle electrical system to the processor.

28. The system of claim 25, wherein the control device comprises means for transferring electrical energy available from the generator or stored energy source to the electrical load comprising:
   to disconnect the electrical load when a current drawn by said load exceeds a prescribed threshold; and
   to connect said load when an ignition signal associated with the generator has been determined to indicate an operating vehicle electrical system when it follows the absence of the ignition signal.

29. The system of claim 28, wherein the means for transferring electrical energy available from the generator or stored energy source to the electrical load comprises integrated circuit modules with built-in logic to limit the current drawn by said load.

30. A control device for controlling and distributing electrical energy in a vehicle electrical system, comprising:
   a processor;
   a sensor that detects electrical signals generated by a generator, electrical load, and stored energy source in the vehicle electrical system;
   a switching system for the generator, electrical load, and stored energy source; and
   programming code operable on the processor to process said electrical signals to ascertain certain electrical signatures, and to connect or disconnect selectively through the switching system said generator, electrical load, and stored energy source, or any combination thereof, with the vehicle electrical system when said electrical signatures have been verified.

31. The control device of claim 30, further comprising a sensor that detects a frequency and amplitude of an output voltage, energize signal, alternating current, and ignition signal, associated with the generator.

32. The control device of claim 30, further comprising a sensor that detects a frequency and amplitude of an output voltage and current of an auxiliary-port.

33. The control device of claim 30, further comprising a sensor that detects a frequency and amplitude of a current flow into the stored energy source.

34. The control device of claim 30, further comprising a sensor that detects a frequency and amplitude of a current flow out of the stored energy source.

35. The control device of claim 30, wherein the program code operable on the processor instructs the switching system to connect or disconnect selectively a generator or stored energy source with a vehicle electrical system comprising:
   to disconnect the generator or stored energy source from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine;
   to inhibit said disconnection of the generator or stored energy source from the vehicle electrical system when a current flow associated with the stored energy source has been determined to be cyclical; and
   to connect the generator or stored energy source to the vehicle electrical system when an energize signal from an energize line associated with the generator has been determined to indicate an operating vehicle electrical system, wherein the existence of a voltage at the energize line indicates an operating vehicle electrical system.

36. The control device of claim 30, wherein the program code operable on the processor instructs the switching system to connect or disconnect selectively an electrical load with a vehicle electrical system comprising:
   to disconnect the electrical load when a current drawn by said load exceeds a prescribed threshold; and
   to connect said load when an ignition signal associated with the generator has been determined to indicate an operating vehicle electrical system when it follows the absence of the ignition signal.

37. The control device of claim 35, wherein the switching system further comprises a bi-directional semiconductor switch module.

38. The control device of claim 36, wherein the switching system further comprises integrated circuit modules with built-in logic to limit the current drawn by said load.

39. The control device of claim 30, further comprising means for generating a status signal in response to connection or disconnection of a generator, electrical load, or stored energy source.

40. The control device of claim 39, wherein the means for generating a status signal comprises a flashing visual indicator.

41. A control device for controlling and distributing electrical energy in a vehicle electrical system, comprising:
   means for sensing electrical signals generated by a generator, electrical load, and stored energy source in the vehicle electrical system;
   means for switching the generator, electrical load, and stored energy source; and
   means for processing said electrical signals;
   said means for processing ascertains certain electrical signatures and selectively connects or disconnects said generator, electrical load, or stored energy source, or any combination thereof, via said means for switching, when said electrical signatures have been verified.

42. The control device of claim 41, wherein the means for processing causes said means for switching to connect or disconnect selectively a generator or stored energy source with a vehicle electrical system comprising:
   to disconnect the generator or stored energy source from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine;
   to inhibit said disconnection of the generator or stored energy source from the vehicle electrical system when a current flow associated with the stored energy source has been determined to be cyclical; and
   to connect the generator or stored energy source to the vehicle electrical system when an energize signal from an energize line associated with the generator has been determined to indicate an operating vehicle electrical system, wherein the existence of a voltage at the energize line indicates an operating vehicle electrical system.

43. The control device of claim 41, wherein the means for processing causes said means for switching to connect or disconnect selectively an electrical load with a vehicle electrical system comprising:

to disconnect the electrical load when a current drawn by said load exceeds a prescribed threshold; and to connect said load when an ignition signal associated with the generator has been determined to indicate an operating vehicle electrical system when it follows the absence of the ignition signal.

44. A method for controlling and distributing electrical energy in a vehicle electrical system, the method comprising:
 (a) monitoring electrical signals generated by a generator, electrical load, and stored energy source in the vehicle electrical system;
 (b) processing the electrical signals to ascertain certain electrical signatures; and
 (c) selectively connecting or disconnecting the generator, electrical load, or stored energy source, or any combination thereof, with the vehicle electrical system when said electrical signatures have been verified.

45. The method of claim 44, wherein (a) comprises sensing a frequency of electrical signals generated by said generator, electrical load, or stored energy source in the vehicle electrical system.

46. The method of claim 44, wherein (a) comprises sensing an amplitude of electrical signals generated by said generator, electrical load, or stored energy source in the vehicle electrical system.

47. The method of claim 44, wherein (b) comprises quantifying electrical signals received from a generator, electrical load, or stored energy source in the vehicle electrical system, and comparing them with a predetermined value.

48. The method of claim 47, wherein the step of quantifying comprises measuring a frequency of said electrical signals received from said generator, electrical load, or stored energy source in the vehicle electrical system.

49. The method of claim 47, wherein the step of quantifying comprises measuring an amplitude of said electrical signals received from said generator, electrical load, or stored energy source in the vehicle electrical system.

50. The method of claim 44, wherein (c) comprises disconnecting the generator or stored energy source from the vehicle electrical system when a prescribed time delay expires and an alternating current and ignition signal associated with the generator have been determined to indicate a non-operating vehicle engine wherein the absence of either the alternating current or ignition signal indicates a non-operating vehicle engine, and further inhibiting said disconnection of the generator or stored energy source from the vehicle electrical system when a current flow associated with the stored energy source has been determined to be cyclical, and further connecting the generator or stored energy source to the vehicle electrical system when an energize signal from an energize line associated with the generator has been determined to indicate an operating vehicle electrical system, wherein the existence of a voltage at the energize line indicates an operating vehicle electrical system.

51. The method of claim 44, wherein (c) comprises disconnecting the electrical load when a current drawn by said load exceeds a prescribed threshold, and further connecting said load when an ignition signal associated with the generator has been determined to indicate an operating vehicle electrical system when it follows the absence of the ignition signal.

52. A method for controlling and distributing electrical energy from a generator in a vehicle electrical system, the method comprising:
 (a) monitoring electrical signals generated by the generator, electrical load, and stored energy source in the vehicle electrical system;
 (b) processing said signals to ascertain certain electrical signatures; and
 (c) transferring electrical energy available from the generator to the electrical load or stored energy source when said electrical signatures have been verified.

53. The method of claim 52, wherein (a) comprises sensing a frequency and amplitude of the electrical signals generated by the generator, electrical load, or stored energy source in the vehicle electrical system.

54. The method of claim 52, wherein (b) comprises measuring a frequency and amplitude of the electrical signals generated by the generator, electrical load, or stored energy source in the vehicle electrical system, and comparing them with a pre-determined value.

55. The method of claim 52, wherein (c) comprises selectively connecting or disconnecting a generator with the vehicle electrical system.

56. The method of claim 55, further comprising disconnecting the generator from the vehicle electrical system when a prescribed time delay expires and an alternating current and ignition signal associated with the generator have been determined to indicate a non-operating vehicle engine wherein the absence of either the alternating current or the ignition signal indicates a non-operating vehicle engine, and further comprising inhibiting said disconnection of the generator from the vehicle electrical system when a current flow associated with the stored energy source has been determined to be cyclical.

57. The method of claim 55, further comprising connecting the generator to the vehicle electrical system when an energize signal associated with the generator has been determined to indicate an operating vehicle electrical system, wherein the existence of a voltage at the energize line indicates an operating vehicle electrical system.

58. A method for controlling and distributing electrical energy from a stored energy source in a vehicle electrical system, the method comprising:
 (a) monitoring electrical signals generated by the stored energy source, generator, and electrical load in the vehicle electrical system;
 (b) processing said signals to ascertain certain electrical signatures; and
 (c) transferring electrical energy available from the stored energy source to the electrical load or generator when said electrical signatures have been verified.

59. The method of claim 58, wherein (a) comprises sensing a frequency and amplitude of the electrical signals generated by the generator, electrical load, or stored energy source in the vehicle electrical system.

60. The method of claim 58, wherein (b) comprises measuring a frequency and amplitude of the electrical signals generated by the generator, electrical load, or stored energy source in the vehicle electrical system, and comparing them with a pre-determined value.

61. The method of claim 58, wherein (c) comprises selectively connecting or disconnecting a stored energy source with the vehicle electrical system.

62. The method of claim 61, further comprising disconnecting a stored energy source from the vehicle electrical system when a prescribed time delay expires and an alternating current and ignition signal associated with the generator have been determined to indicate a non-operating vehicle engine wherein the absence of either the alternating current or the ignition signal indicates a non-operating vehicle engine, and further comprising inhibiting said disconnection of the stored energy source from the vehicle electrical system when a current flow associated with the stored energy source has been determined to be cyclical.

63. The method of claim 61, further comprising connecting a stored energy source to the vehicle electrical system when an energize signal associated with the generator has been determined to indicate an operating vehicle electrical system, wherein the existence of a voltage at the energize line indicates an operating vehicle electrical system.

64. A method for controlling and distributing electrical energy through an electrical load in a vehicle electrical system, the method comprising:
   (a) monitoring electrical signals generated by the electrical load, generator, and stored energy source in the vehicle electrical system;
   (b) processing said signals to ascertain certain electrical signatures; and
   (c) transferring electrical energy available from the generator or stored energy source to the electrical load when said electrical signatures have been verified.

65. The method of claim 64, wherein (a) comprises sensing a frequency and amplitude of the electrical signals generated by the generator, electrical loads, or stored energy source in the vehicle electrical system.

66. The method of claim 64, wherein (b) comprises measuring a frequency and amplitude of the electrical signals generated by the generator, electrical load, or stored energy source in the vehicle electrical system, and comparing them with a pre-determined value.

67. The method of claim 64, wherein (c) comprises selectively connecting or disconnecting an electrical load with the vehicle electrical system.

68. The method of claim 67, further comprising disconnecting said load from the vehicle electrical system when a current drawn by said load exceeds a prescribed threshold.

69. The method of claim 67, further comprising connecting said load to the vehicle electrical system when an ignition signal associated with the generator has been determined to indicate an operating vehicle electrical system when it follows the absence of the ignition signal.

70. A system for controlling and distributing electrical energy in a vehicle electrical system, comprising:
   a generator;
   an electrical load;
   a stored energy source; and
   a control device connected to and in communication with at least one of the vehicle electrical system, generator, electrical load, and stored energy source;
   said control device monitoring an electrical signal generated by at least one of the generator, electrical load, and stored energy source, and processing the electrical signal to ascertain a certain electrical signature, and selectively connecting or disconnecting at least one of the remaining of the generator, electrical load, or stored energy source, or any combination thereof, with the vehicle electrical system when said electrical signature has been verified.

71. The system of claim 70, wherein the electrical signal comprises at least one of an amplitude and frequency.

72. A control device for controlling and distributing electrical energy in a vehicle electrical system, comprising:
   a processor;
   a sensor that detects an electrical signal generated by at least one of a generator, electrical load, and stored energy source in the vehicle electrical system;
   a switching system for at least one of the generator, electrical load, and stored energy source; and
   programming code operable on the processor to process said electrical signal to ascertain a certain electrical signature, and to connect or disconnect selectively through the switching system at least one of the remaining of said generator, electrical load, and stored energy source, or any combination thereof, with the vehicle electrical system when said electrical signature has been verified.

73. The control device of claim 72, wherein the electrical signal comprises at least one of an amplitude and frequency.

74. A method for controlling and distributing electrical energy in a vehicle electrical system, the method comprising:
   (a) monitoring an electrical signal generated by at least one of a generator, electrical load, and stored energy source in the vehicle electrical system;
   (b) processing the electrical signal to ascertain a certain electrical signature; and
   (c) selectively connecting or disconnecting at least one of the remaining of the generator, electrical load, or stored energy source, or any combination thereof, with the vehicle electrical system when said electrical signature has been verified.

75. The method of claim 74, wherein the electrical signal comprises at least one of an amplitude and frequency.

* * * * *